(12) United States Patent
Saiki

(10) Patent No.: US 9,783,150 B2
(45) Date of Patent: Oct. 10, 2017

(54) PASSENGER PROTECTION DEVICE OF VEHICLE

(71) Applicant: MAZDA MOTOR CORPORATION, Hiroshima (JP)

(72) Inventor: Hideharu Saiki, Hatsukaichi (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 1 day.

(21) Appl. No.: 15/089,779

(22) Filed: Apr. 4, 2016

(65) Prior Publication Data

US 2016/0297395 A1   Oct. 13, 2016

(30) Foreign Application Priority Data

Apr. 7, 2015  (JP) ................... 2015-078307

(51) Int. Cl.
| | |
|---|---|
| *B60R 21/16* | (2006.01) |
| *B60R 21/232* | (2011.01) |
| *B60R 21/213* | (2011.01) |
| *B60R 21/2334* | (2011.01) |
| *B60R 21/235* | (2006.01) |

(52) U.S. Cl.
CPC .......... *B60R 21/232* (2013.01); *B60R 21/213* (2013.01); *B60R 21/235* (2013.01); *B60R 21/2334* (2013.01); *B60R 2021/23509* (2013.01)

(58) Field of Classification Search
CPC . B60R 13/025; B60R 21/213; B60R 13/0275; B60R 13/06; B60R 2013/0287; B60R 2013/0293; B60R 2021/161

USPC ................. 280/730.2, 743.1, 743.2
See application file for complete search history.

(56) References Cited

U.S. PATENT DOCUMENTS

| | | | | |
|---|---|---|---|---|
| 8,550,494 | B2* | 10/2013 | Ochiai | B60R 21/213 280/728.2 |
| 8,596,672 | B2* | 12/2013 | Sugiyama | B60R 21/213 280/728.2 |
| 9,308,884 | B2* | 4/2016 | Ochiai | B60R 21/232 |
| 2003/0075910 | A1* | 4/2003 | Inoue | B60R 13/02 280/749 |
| 2004/0075257 | A1* | 4/2004 | Ogawa | B60R 21/213 280/730.2 |
| 2008/0122206 | A1* | 5/2008 | Iwayama | B60R 13/0225 280/730.2 |
| 2008/0296928 | A1 | 12/2008 | Matsuoka et al. | |
| 2009/0091105 | A1* | 4/2009 | Okimoto | B60R 21/213 280/728.3 |

(Continued)

FOREIGN PATENT DOCUMENTS

JP   2003-095055 A   4/2003

*Primary Examiner* — Toan To
(74) *Attorney, Agent, or Firm* — Studebaker & Brackett PC

(57) ABSTRACT

A curtain airbag in a stored state is provided to extend in a vehicle longitudinal direction at an upper position of a border of a pillar trim and a top ceiling. A guide portion is provided at an upper portion of the pillar trim so as to guide the curtain airbag which is being inflated toward a vehicle compartment. The curtain airbag includes a patch portion as an inflation suppression portion at a position which overlaps with the guide portion when viewed from the inside of the vehicle compartment. The patch portion as the inflation suppression portion is configured to suppress inflation of part of the curtain airbag where the patch portion is provided.

20 Claims, 6 Drawing Sheets

(56) References Cited

U.S. PATENT DOCUMENTS

| | | | | |
|---|---|---|---|---|
| 2009/0236832 A1* | 9/2009 | Ilda | ............... | B60R 21/213 |
| | | | | 280/730.1 |
| 2011/0285117 A1* | 11/2011 | Shamoto | ............... | B60R 21/213 |
| | | | | 280/730.2 |
| 2013/0257023 A1* | 10/2013 | Nakamura | ............... | B60R 21/20 |
| | | | | 280/728.2 |
| 2015/0239415 A1* | 8/2015 | Tsujimoto | ............... | B60R 21/217 |
| | | | | 280/728.2 |

* cited by examiner

PASSENGER PROTECTION DEVICE OF VEHICLE

BACKGROUND OF THE INVENTION

The present invention relates to a passenger protection device of a vehicle which uses a curtain airbag.

Automotive vehicles as vehicles are generally provided with airbags to protect passengers in a vehicle collision. A curtain airbag among the airbags is configured to be inflated beside a seat, i.e., along an inner face of a side widow glass, in the vehicle collision. The curtain airbag is stored behind a pillar trim and a top ceiling such that the curtain airbag in a stored state extends in a vehicle longitudinal direction, being isolated from an inside of a vehicle compartment.

Since the curtain airbag is configured to be inflated beside the seat where a passenger is seated, in a case in which the vehicle is equipped with three row seats, for example, a longitudinal length of the curtain airbag is configured to be considerably long. Japanese Patent Laid-Open Publication No. 2003-95055 discloses an airbag which comprises a gas distribution-guide means for distributing and guiding inflating gas in a longitudinal direction from an inflator. Further, U.S. Patent Application Publication No. 2008/0296928 A1 discloses a device in which a guide portion to guide a curtain airbag toward the inside of the vehicle compartment during the curtain airbag is inflated is provided at an upper portion of the pillar trim.

Since an inflation pressure (a load according to the inflation pressure) acts on the guide portion to guide the curtain airbag provided at the pillar trim toward the inside of the vehicle compartment, the guide portion is required to have a relatively-high rigidity in order to endure (resist against) the inflation pressure. Meanwhile, in a case in which the curtain airbag is applied to the three row seats and the inflation pressure is set to be considerably large, for example, there is a concern that the above-described guide portion may get broken. Herein, it is considered that the rigidity of the guide portion is further increased for prevention of a breakage of the guide portion. In this case, however, it may be a problem how to ensure the safety when a passenger hits against this guide portion in the vehicle collision.

SUMMARY OF THE INVENTION

The present invention has been devised in view of the above-described matter, and an object of the present invention is to provide a passenger protection device of a vehicle which can compatibly achieve preventing of the breakage of the guide portion for the curtain airbag which is provided at the pillar trim and ensuring of the safety of the passenger hitting against a portion of the pillar trim which corresponds to the guide portion.

The present invention is a passenger protection device of vehicle, comprising a curtain airbag stored behind a pillar trim and a top ceiling such that the curtain airbag in a stored state extends in a vehicle longitudinal direction, being isolated from an inside of a vehicle compartment, and a guide portion provided at an upper portion of the pillar trim so as to guide the curtain airbag toward the vehicle compartment during the curtain airbag is inflated, wherein the curtain airbag includes an upper gas-flow passage at a position which corresponds to an upper portion of the curtain airbag in an inflated state, the upper gas-flow passage being configured to extend in the vehicle longitudinal direction, crossing the guide portion, and connect to a gas inlet portion in which inflating gas flows from an inflator, the curtain airbag includes an inflation suppression portion at a position which overlaps with the guide portion when viewed from the inside of the vehicle compartment, the inflation suppression portion being configured to suppress inflation of part of the curtain airbag where the inflation suppression portion is provided.

According to the present invention, even if the inflation pressure of the curtain airbag is large, the inflation pressure acting on the guide portion can be suppressed (reduced) by the inflation suppression portion, so that the breakage of the guide portion can be prevented. Further, since the inflation pressure acting on the guide portion can be suppressed (reduced), the rigidity of the guide portion can be maintained to be relatively small, which is preferable in ensuring the safety of the passenger hitting against the guide portion in the vehicle collision. Moreover, since the curtain airbag includes the upper gas-flow passage extending in the vehicle longitudinal direction, the inflating gas from the inflator can be effectively distributed in the vehicle longitudinal direction inside the curtain airbag.

According to an embodiment of the present invention, the inflation suppression portion is arranged at a front portion of the upper gas-flow passage, and the curtain airbag comprises a cell which is formed at a position located in front of the inflation suppression portion, the cell being configured such that an upper-side portion thereof is closed and the inflating gas flows in from a lower-side portion thereof when the curtain airbag is inflated. Thereby, even if the inflation suppression portion is provided, it can be properly prevented that the inflation suppression portion blocks smooth gas flowing inside the curtain airbag.

According to another embodiment of the present invention, the curtain airbag comprises an inflation portion which is positioned located below the inflation suppression portion and extends vertically along the pillar trim when the curtain airbag is inflated, the inflation portion being configured such that the inflating gas flows in from a lower-side portion thereof. Thereby, it can be prevented or suppressed that the vicinity of the inflation suppression portion is inflated (the inflation pressure becomes large) unnecessarily by the inflation from the lower-side portion.

According to another embodiment of the present invention, an inner bag is provided at the gas inlet portion of the curtain airbag, the inner bag branches at a position located above said inflation suppression portion into two or more branch flow passages which connect to gas-flow passages, and each of the branch flow passages extend downward to a position which overlaps with the inflation suppression portion. Thereby, it can be prevented that the vicinity of the inflation suppression portion is inflated (the inflation pressure becomes large) unnecessarily by using the inner bag, providing smooth gas introduction into the curtain airbag.

According to another embodiment of the present invention, respective openings of the branch flow passages which open at the upper gas-flow passage are positioned at areas which are located outside the pillar trim in the vehicle longitudinal direction. Thereby, respective portions of the top ceiling which are positioned in front of and in back of the pillar trim are pushed out and then opened at an early stage of the inflation of the curtain airbag, that is—the top ceiling is pushed out toward the inside of the vehicle compartment at its portion corresponding to the pillar trim promptly, which is more preferable in preventing that the large inflation pressure acts on the guide portion.

According to another embodiment of the present invention, the curtain airbag includes a vertical gas-flow passage which extends in a vertical direction along the pillar trim at a position located in front of the inflation suppression portion, and one of the branch flow passages is provided to extend to the vertical gas-flow passage extending in the vertical direction along the pillar trim. Thereby, the inflating gas smoothly flows down the vertical gas-flow passage, which is preferable in preventing a portion of the curtain airbag which is located near the pillar trim from being inflated unnecessarily (the inflation pressure from becoming too large).

According to another embodiment of the present invention, the inflation suppression portion is reinforced by two-sheet overlapped cloth-made reinforcing materials, and the two-sheet cloth-made reinforcing materials are attached to the curtain airbag such that respective fiber directions (fine-line directions) of the two-sheet cloth-made reinforcing materials attached cross each other. Thereby, the strength of the inflation suppression portion is ensured surely, which is preferable in preventing a situation in which a portion of the curtain airbag where the inflation suppression portion is provided gets damaged.

Other features, aspects, and advantages of the present invention will become apparent from the following description which refers to the accompanying drawings.

DETAILED DESCRIPTION OF THE INVENTION

Figure 1:
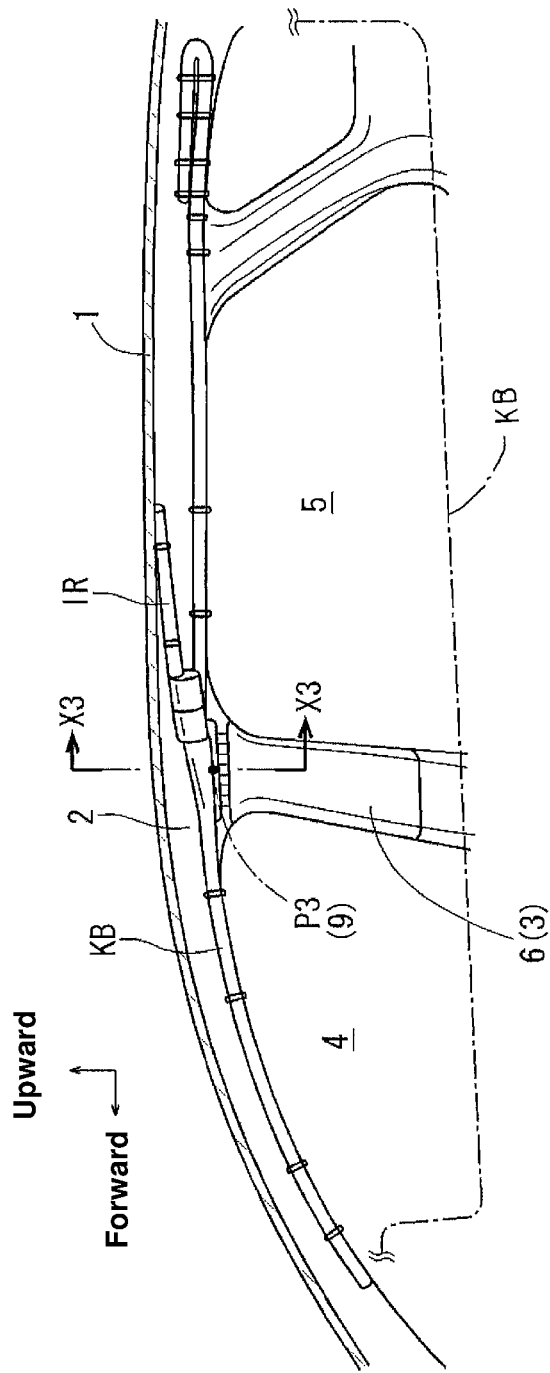
FIG. 1 is a major-part side view of a curtain airbag in a stored state showing a state in which a top ceiling is removed, when viewed from an inside of a vehicle compartment.
Figure 2:
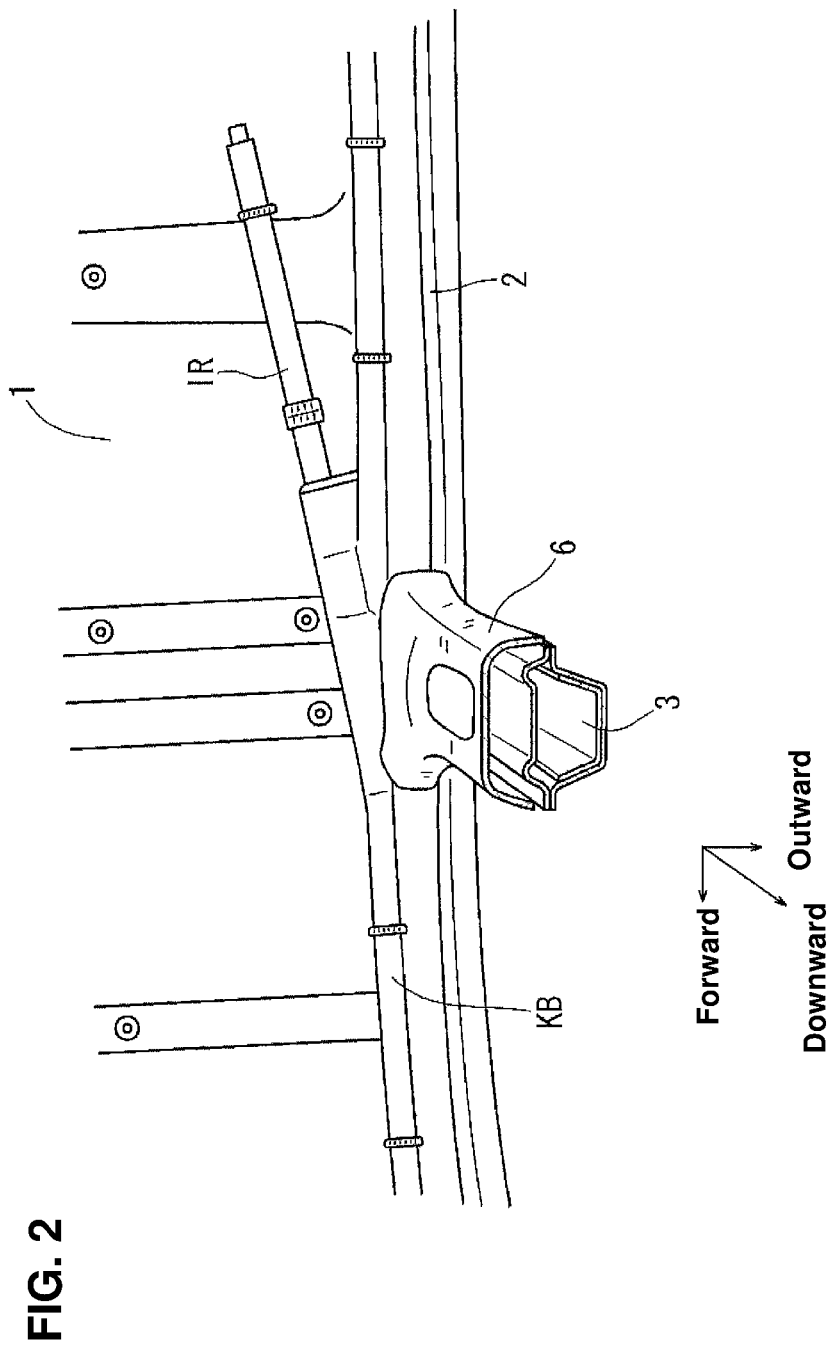
FIG. 2 is a partial side view of the state shown in FIG. 1, when viewed from below.
Figure 3:
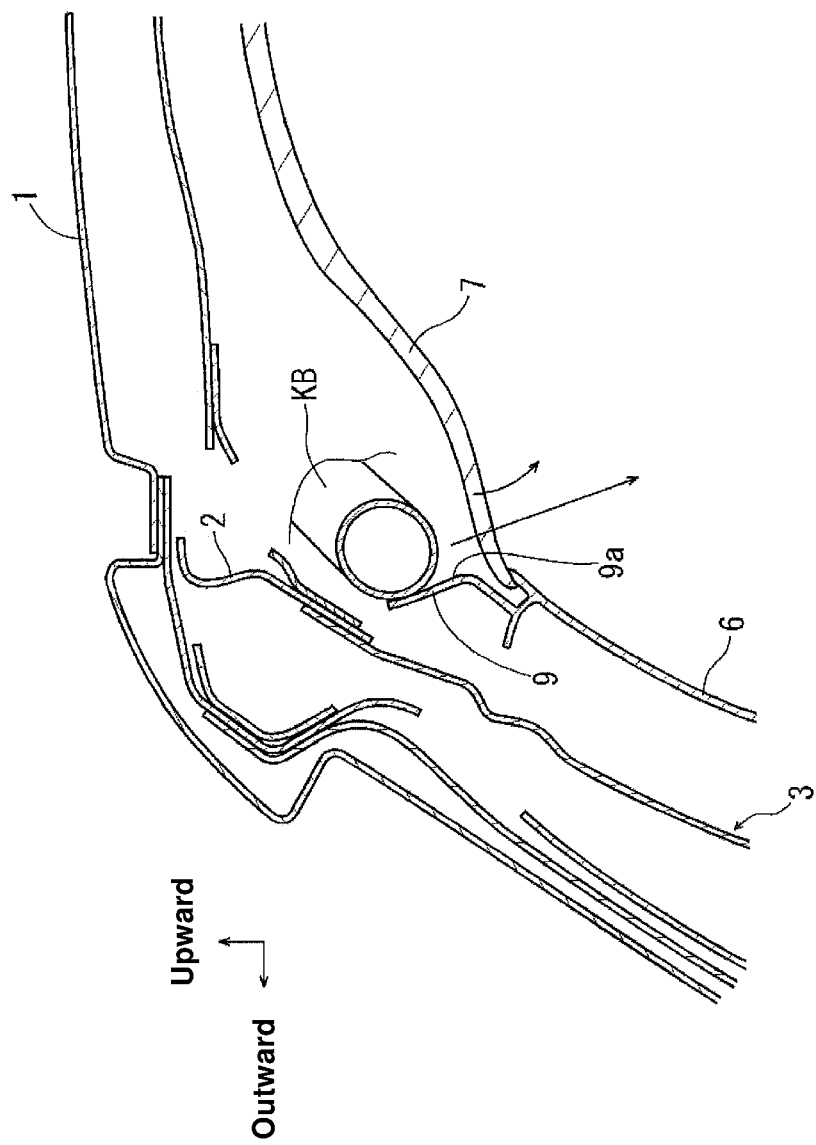
FIG. 3 is a sectional view taken along line X3-X3 of FIG. 1.

FIGS. 1-3 show a portion of a vehicle body provided with three row seats, and in the figures, reference character 1 denotes a roof, reference character 2 shows a roof side rail, and reference character 3 denotes a B pillar. An opening portion 4 which is positioned in front of the B pillar 3 is an opening for ingress/egress of a first-row seat (a driver's seat, a passenger seat (assistant driver's seat) and an opening portion 5 which is positioned in back of the B pillar 3 is a side opening for ingress/egress of a second-row seat and a third-row seat.

In FIG. 3, a pillar trim which covers the B pillar 3 from an inside of a vehicle compartment is denoted by reference character 6, and a top ceiling which covers an inner face of the roof 1 is denoted by reference character 7. An outward edge portion, in a vehicle width direction, of the top ceiling 7 is covered with an upper portion of the pillar trim 6 from the inside of the vehicle compartment. A guide portion 9 is formed integrally with the upper portion of the pillar trim 6. The guide portion 9 has a slant face (guide face) 9a which slants downward and inward in the vehicle width direction.

A curtain airbag KB in a stored state is arranged along the roof side rail 2. The curtain airbag KB is configured to extend in a vehicle longitudinal direction so as to work for three row seats. A gas inlet portion 20 of the curtain airbag KB is positioned near an upper portion of the B pillar 3, and an inflator IR is connected to the gas inlet portion 20. The curtain airbag KB including the inflator IR is, as shown in FIG. 3, provided at a position located near and above a border of the pillar trim 6 and above the top ceiling 7. Further, the curtain airbag KB in the stored state is arranged such that it passes through near the guide portion 9 (the slant face 9a) (such that the curtain airbag KB partially overlaps with the guide portion 9 when viewed from an inward side, in a vehicle width direction, of the vehicle).

Figure 4:
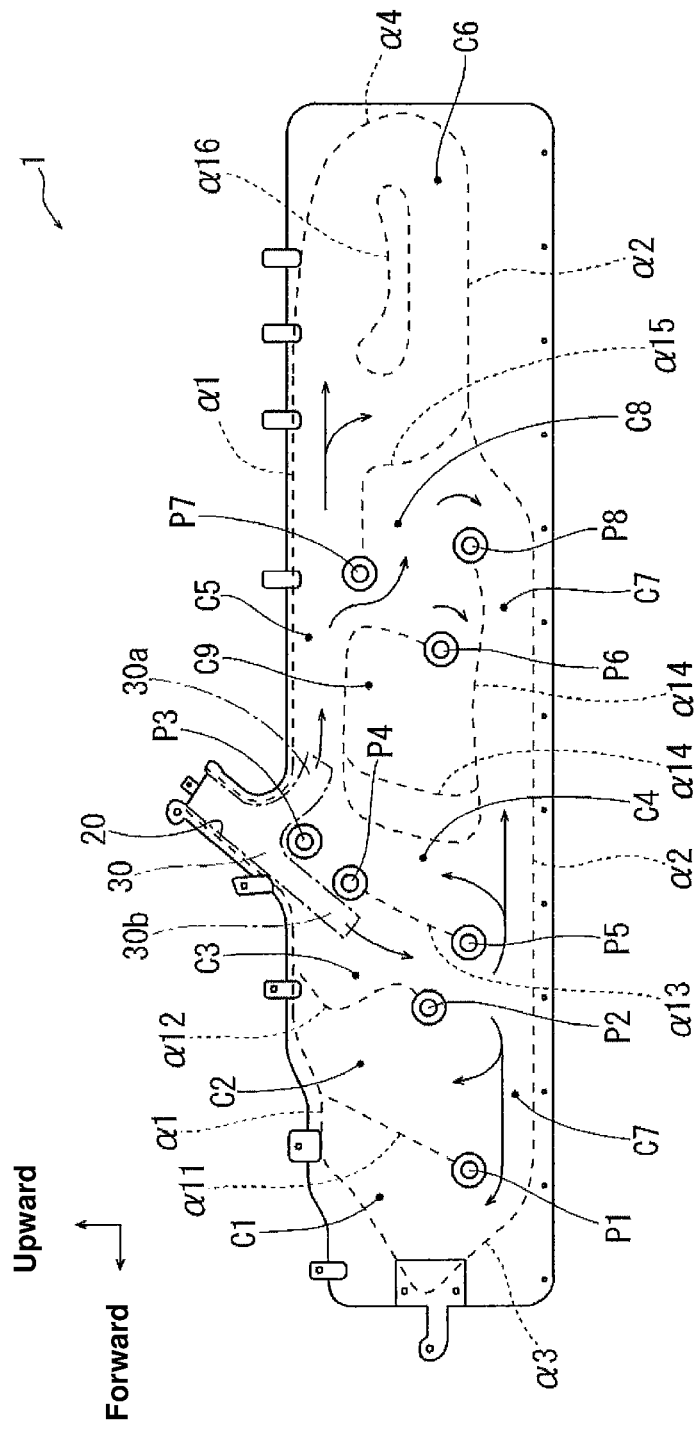
FIG. 4 is a side view showing an example of the curtain airbag in an inflated state.

FIG. 4 illustrates a shape (contour) of the curtain airbag KB in the stored state in a state in which no inflating gas is supplied. The curtain airbag KB is inflated as described below when the inflating gas is supplied from the inflator IR. A positional relationship of this inflated curtain airbag KB relative to a vehicle body is shown by a one-dotted broken line in FIG. 1. When a gas pressure is generated by the inflator IR, the curtain airbag is inflated by the gas pressure toward the inside of the vehicle compartment. In this case, the curtain airbag KB which is being inflated is directed toward the inside of the vehicle compartment by the guide portion 9. Of course, the curtain airbag KB is inflated into the vehicle compartment, pushing out the pillar trim 6 and the top ceiling 7.

Next, the details of the curtain airbag KB will be described referring to FIG. 4. The curtain airbag KB is formed in a bag shape by front base-cloth and back base-cloth. In FIG. 4, partition lines which connect the front base-cloth and the back base-cloth (sowing lines which stitch the front base-cloth and the back base-cloth) are illustrated by broken lines. The partition lines comprise an upper partition line α1 and a lower partition line α2, a front partition line α3 which interconnects respective front portions of the both partition lines α1 and α2, and a rear partition line α4 which interconnects respective rear portions of the both partition lines α1 and α2. The contour of the bag-shaped portion of the curtain airbag KB is determined by these continuous partition lines α1-α4.

The upper partition line α1 is configured not to exist at the gas inlet portion 20, and the inflating gas from the gas inlet portion 20 is supplied into bag portions formed by the partition lines α1-α4. The gas inlet portion 20 is positioned at an upper portion of the B pillar 3 (the pillar trim 6).

The curtain airbag KB includes patch portions which form non-inflation portions (reinforcement portions which connect, in a spot manner, the front base-close and the back base-cloth) P1-P8 which form non-inflation portions and inside partition lines α11-α16 in the bag-shaped portion partitioned by the partition lines α1-α4. The patch portion P1 is arranged at a foremost and lower position. The patch portion P1 and the upper partition line α1 are made to be continuous (are connected) by a partition line α11 which extends in the vertical direction, so that a cell C1 as an inflation portion is formed in front of the partition line α11. Herein, in the following description, the cells and gas-flow passages are common in forming an inflation portion, but cells merely receive the inflating gas (not making the inflating gas flow out), whereas the gas-flow passages have the function of making the inflating gas flow out to other gas-flow passages and cells.

The patch portion P2 is arranged at a position which is located slightly in back of the patch portion P1 and in front of the gas inlet portion 20. The patch portion P2 is positioned slightly above the patch portion P1. The patch portion P2 and the upper partition line α1 are connected by the partition line α12 extending in the vehicle direction. A cell C2 is formed between the partition line α12 and the above-described partition line α11.

The patch portion P3 as the inflation suppression portion is provided right below the gas inlet portion 20, the patch portion P4 is provided slightly in front of and below the patch portion P3, and the patch portion P5 is provided below the patch portion P4. The patch portions P4 and P5 are connected by the partition line α13. A gas-flow passage C3 extending in the vertical direction is formed between the partition line α13 and the above-described partition line α12.

The patch portions P6-P8 are arranged in back of the gas inlet portion 20. The three patch portions P6-P8 are positioned at positions corresponding to an apex of a triangle. The patch portions P6 and P8 are connected by the partition line α14. The partition line α14 is configured to extend roughly straightly forward from the patch portion P8, passing through below the patch portion P6, then extends upward from the patch portion P6 (two parallel lines extend upward), then extends roughly straightly rearward, and then extends downward toward the patch portion P6. The patch portion P7 is connected to the lower partition line α2 by the partition line α15 at a position located in back of the patch portion P8.

An upper gas-flow passage C5 which is connected to the gas inlet portion 20 is formed between the upper partition line α1 and respective upper portions extending in the vehicle longitudinal direction of the partition lines α14 and α15. The upper gas-flow passage C5 is provided at an upper portion of the curtain airbag KB and extends in the vehicle longitudinal direction over an area from a portion located slightly in front of the gas inlet portion 20 to a rear portion of the curtain airbag KB.

The ring-shaped partition line α16 is provided at the rear portion of the curtain airbag KB, thereby forming a cell C6 in a ring shape together with the upper gas-flow passage C5 at the rear portion of the curtain airbag KB.

A lower gas-flow passage C7 which extends in the vehicle longitudinal direction is formed between the patch portions P1, P2, P5, P8 and the lower partition line α2. A gas-flow passage C8 which connects the upper gas-flow passage C5 and the lower gas-flow passage C7 is formed by a portion of the partition line α14 and a portion of the partition line α15. Further, a gas-flow passage C9 which connects to the gas-flow passage C8 is formed by the patch portions P6, P8 and the partition line α14.

A gas-flow passage C4 is formed between the patch portions P3, P5 and the partition line α13 and the front-side vertically-extending partition line α14. The gas-flow passage C4 extends in the vertical direction so as to connect the upper gas-flow passage C5 and the lower gas-flow passage C7. The gas-flow passage C4 extends along the pillar trim 6 (the B pillar 3) and is positioned such that it overlaps with the pillar trim 6 when viewed from the inside of the vehicle compartment.

The curtain airbag KB includes an inner bag 30 therein as shown by a one-dotted broken line in FIG. 4. An upstream portion of the inner bag 30 engages with the gas inlet portion 20 so that the inner bag 30 can form a substantial gas-flow portion of the curtain airbag KB. Further, the inner bag 30 branches into two branch flow passages 30a, 30b at a position located above the patch portion P3 as an inflation suppression portion.

The branch flow passage 30a extends downward to a position where it overlaps with the patch portion P3 in the vertical direction and opens at a front portion of the upper gas-flow passage C5. An open position of the branch flow passage 30a at the upper gas-flow passage C5 is located in back of the pillar trim 6. Further, the branch flow passage 30b extends beyond the patch portion P3 to a position located slightly below the patch portion P4 and opens at an area inside the gas-flow passage C3. An open position of the branch flow passage 30b at the gas-flow passage C3 is located in front of the pillar trim 6.

A sate in which the inflating gas generated by the inflator IR flows inside the curtain airbag KB is illustrated by arrows in FIG. 4. That is, the inflating gas from the inflator IR is supplied into the upper gas-flow passage C5 from the branch flow passage 30a of the inner bag 30, and flows through the cell C6 and the gas-flow passage C8 and then flows into the cell C9 and the lower gas-flow passage C7 from the gas-flow passage C8.

Meanwhile, the inflating gas from the inflator IR is supplied into the gas-flow passage C3 from the branch flow passage 30b of the inner bag 30. The inflating gas supplied into the gas-flow passage C3 flows to the cells C1, C2 by way of the lower gas-flow passage C7, and also flows into the gas-flow passage C4. Thus, the gas flow to the cells C1, C2 and the gas-flow passage C4 becomes a flow directed to an upper side from a lower side. Since the branch flow passage 30b opens at the gas flow passage C3 at a position located considerably below the patch portion P3, a situation in which the inflating gas from the branch flow passage 30b is directly supplied to the patch member P3 as the inflation suppression portion is prevented.

The patch portion P3 as the inflation suppression portion is located at a position shown by a black circle in FIG. 1. That is, the patch portion P3 is located at the position corresponding to the guide portion 9 formed at the pillar trim 6 in the vehicle longitudinal direction (the patch portion P3 and the guide portion 9 overlap with each other when viewed from the inside of the vehicle compartment).

The patch portion P3 as the inflation suppression portion is located at the position corresponding to the guide portion 9, so that it is prevented (suppressed) that a large inflation pressure (a load according to the inflation pressure) acts on the guide portion 9. Thereby, even if the rigidity of the guide portion 9 is set to be so small that there occurs no problem when a passenger hits against the guide portion 9, it is prevented that the guide portion 9 is damaged by the inflation pressure.

Meanwhile, the inflating gas is supplied to a whole area of the curtain airbag KB sufficiently and quickly by using the branch flow passages 30a, 30b of the inner bag 30, so that the curtain airbag KB can be inflated and expanded promptly. In particular, the upper gas-flow passage C5 extending in the vehicle longitudinal direction and the lower gas-flow passage C7 are connected to each other at longitudinal plural points by the vertically-extending gas-flow passages C3, C8, so that the inflating gas can be preferably quickly supplied to a potion of the curtain airbag KB to be inflated. Further, the inflating gas is supplied to the gas-flow passage C4 located at the position which overlaps with the pillar trim 6, so that the gas-flow passage C4 is not inflated unnecessarily largely (it is prevented that the large load acts on the pillar trim 6).

The branch flow passage 30a of the inner bag 30 opens inside the curtain airbag KB at a position located in back of the B pillar 3 (pillar trim 6), and the branch flow passage 30b of the inner bag 30 opens inside the curtain airbag KB at a position located in front of the B pillar 3 (pillar trim 6). Thereby, respective portions of the top ceiling 7 which are positioned in front and back of the B pillar 3 and the pillar trim 6 which correspond to these portions can be pushed out promptly by the curtain airbag KB.

Figure 5:
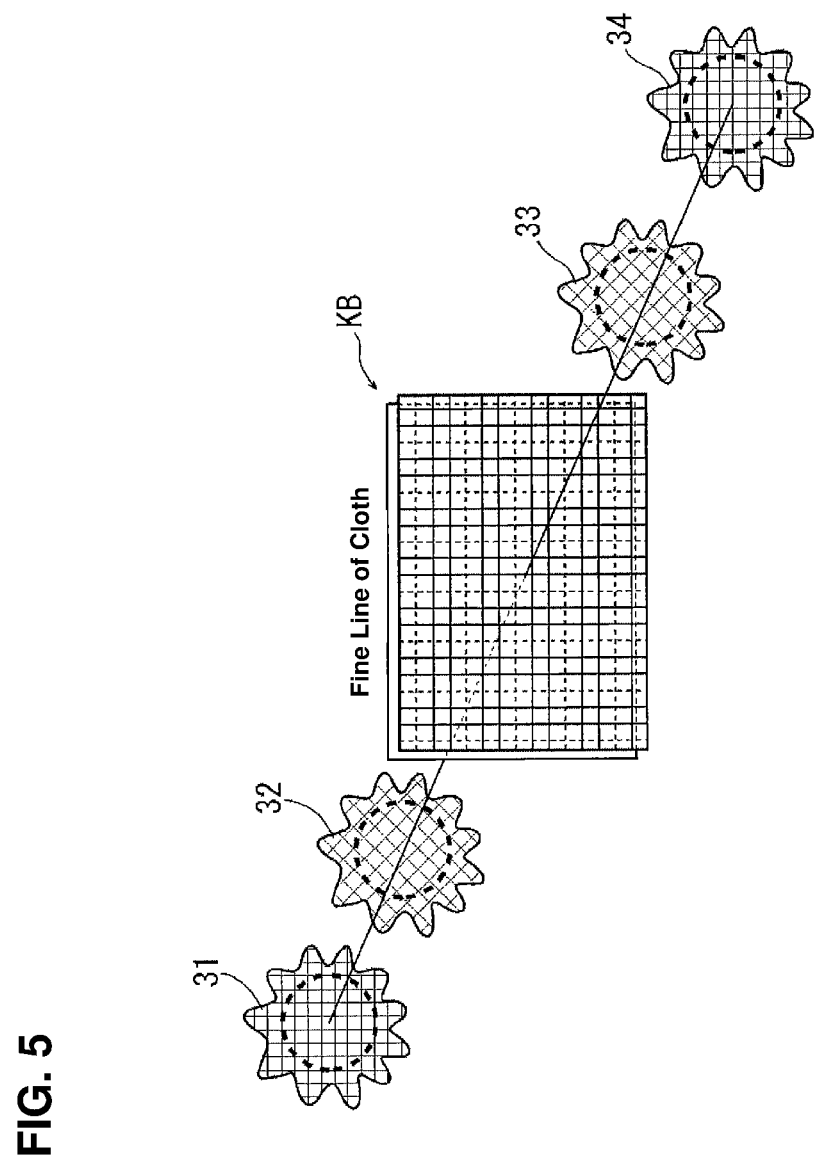
FIG. 5 is an exploded perspective view showing a structural example of an inflation suppression portion.

The strength of the patch portion P3 as the inflation suppression portion is set to be higher than that of the other patch portions P1, P2, P4-P8. That is, as shown in FIG. 5, the patch portion P3 is configured such that in total four-sheet cloth-made reinforcing materials 31-34, i.e., two-sheet cloth-made reinforcing materials being provided on each side of the curtain airbag KB, are stitched to the curtain airbag KB.

The two-sheet reinforcing materials 31, 32 provided on one side of the curtain airbag KB are stitched to the curtain airbag KB such that respective fiber directions (fine-line directions, texture directions) of thereof cross each other. Likewise, the two-sheet reinforcing materials 33, 34 provided on the other side of the curtain airbag KB are stitched to the curtain airbag KB such that respective fiber directions (fine-line directions, texture directions) of thereof cross each other. By configuring the patch portion P3 such that the two-sheet cloth-made reinforcing materials 31, 32 (33, 34) having their fiber directions cross each other are attached to each side of the curtain airbag KB as described above, the performance of suppressing the inflation at the patch portion P3 is considerably enhanced. In FIG. 5, each circle illustrated by a broken line at the reinforcing materials 31-34 denotes a stitch. Herein, each of the other patch portions P1, P2, P4-P8 than the above-described patch portion P3 is configured such that a single-sheet cloth-made reinforcing material is only attached to each side of the curtain airbag KB.

Figure 6:
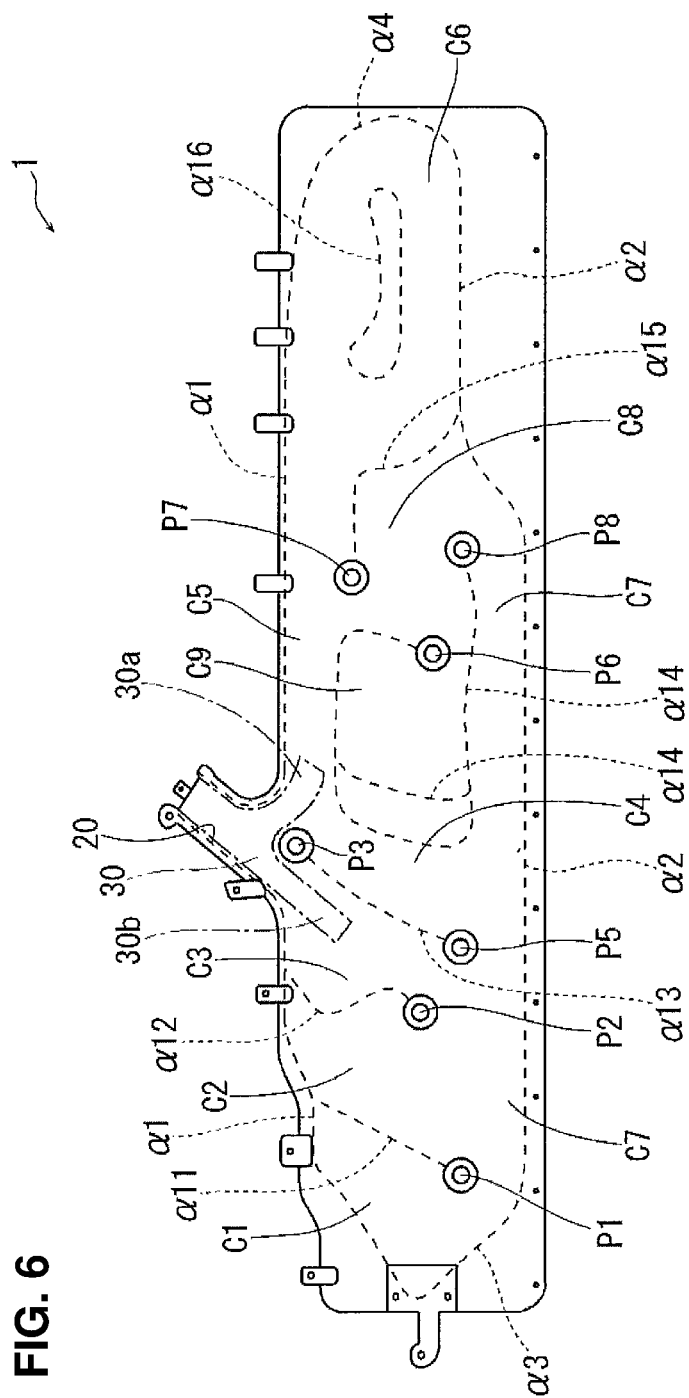
FIG. 6 is a side view showing an example of a modification of the curtain airbag, which corresponds to FIG. 4.

FIG. 6 shows an example of a modification of the curtain airbag KB, and corresponding portions to FIG. 4 are denoted by the same reference characters, duplicated descriptions of which are omitted here. In the present modified example, a different point from the curtain airbag shown in FIG. 4 is that the patch portion P4 is not formed and the patch portion P3 and the patch portion P5 are connected by the partition line α13. This modified example is preferable in making the structure simpler, reducing costs and the like because the patch portion P4 does not exist.

The present invention should not be limited to the above-described embodiments, and any other modifications or improvements may be applied within the scope of a spirit of the present invention. Setting of the position, the shape, the size or the like of the inflation portions (the cells and the gas-flow passages) of the curtain airbag KB is properly changeable. The number of the branch flow passages of the inner bag 30 may be set at three or more. The present invention does not need the above-described inner bag 30. Of course, the object of the present invention is not limited to the one described explicitly, but includes anything which has been implicitly inspired as preferable things or merits.

What is claimed is:

1. A passenger protection device of vehicle, comprising:
   a curtain airbag stored behind a pillar trim and a top ceiling such that the curtain airbag in a stored state extends in a vehicle longitudinal direction, being isolated from an inside of a vehicle compartment; and
   a guide portion provided at an upper portion of the pillar trim so as to guide the curtain airbag toward the vehicle compartment during the curtain airbag is inflated,
   wherein said curtain airbag includes an upper gas-flow passage at a position which corresponds to an upper portion of the curtain airbag in an inflated state, the upper gas-flow passage being configured to extend in the vehicle longitudinal direction, crossing said guide portion, and connect to a gas inlet portion in which inflating gas flows from an inflator,
   said curtain airbag includes an inflation suppression portion at a position which overlaps with said guide portion when viewed from the inside of the vehicle compartment, the inflation suppression portion being configured to suppress inflation of part of the curtain airbag where the inflation suppression portion is provided.

2. The passenger protection device of the vehicle of claim 1, wherein said inflation suppression portion is arranged at a front portion of said upper gas-flow passage, and said curtain airbag comprises a cell which is formed at a position located in front of said inflation suppression portion, the cell being configured such that an upper-side portion thereof is closed and the inflating gas flows in from a lower-side portion thereof when the curtain airbag is inflated.

3. The passenger protection device of the vehicle of claim 1, wherein said curtain airbag comprises an inflation portion which is positioned located below said inflation suppression portion and extends vertically along the pillar trim when the curtain airbag is inflated, the inflation portion being configured such that the inflating gas flows in from a lower-side portion thereof.

4. The passenger protection device of the vehicle of claim 2, wherein said curtain airbag comprises an inflation portion which is positioned located below said inflation suppression portion and extends vertically along the pillar trim when the curtain airbag is inflated, the inflation portion being configured such that the inflating gas flows in from a lower-side portion thereof.

5. The passenger protection device of the vehicle of claim 1, wherein an inner bag is provided at said gas inlet portion of the curtain airbag, said inner bag branches at a position located above said inflation suppression portion into two or more branch flow passages which connect to gas-flow passages, and each of said branch flow passages extend downward to a position which overlaps with the inflation suppression portion.

6. The passenger protection device of the vehicle of claim 2, wherein an inner bag is provided at said gas inlet portion of the curtain airbag, said inner bag branches at a position located above said inflation suppression portion into two or more branch flow passages which connect to gas-flow passages, and each of said branch flow passages extend downward to a position which overlaps with the inflation suppression portion.

7. The passenger protection device of the vehicle of claim 3, wherein an inner bag is provided at said gas inlet portion of the curtain airbag, said inner bag branches at a position located above said inflation suppression portion into two or more branch flow passages which connect to gas-flow passages, and each of said branch flow passages extend downward to a position which overlaps with the inflation suppression portion.

8. The passenger protection device of the vehicle of claim 4, wherein an inner bag is provided at said gas inlet portion of the curtain airbag, said inner bag branches at a position located above said inflation suppression portion into two or more branch flow passages which connect to gas-flow passages, and each of said branch flow passages extend downward to a position which overlaps with the inflation suppression portion.

9. The passenger protection device of the vehicle of claim 5, wherein respective openings of said branch flow passages which open at said upper gas-flow passage are positioned at areas which are located outside said pillar trim in the vehicle longitudinal direction.

10. The passenger protection device of the vehicle of claim 6, wherein respective openings of said branch flow passages which open at said upper gas-flow passage are positioned at areas which are located outside said pillar trim in the vehicle longitudinal direction.

11. The passenger protection device of the vehicle of claim 7, wherein respective openings of said branch flow passages which open at said upper gas-flow passage are positioned at areas which are located outside said pillar trim in the vehicle longitudinal direction.

12. The passenger protection device of the vehicle of claim 5, wherein said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

13. The passenger protection device of the vehicle of claim 6, wherein said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

14. The passenger protection device of the vehicle of claim 7, wherein said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

15. The passenger protection device of the vehicle of claim 9, wherein said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

16. The passenger protection device of the vehicle of claim 10, wherein said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

17. The passenger protection device of the vehicle of claim 11, wherein said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

18. The passenger protection device of the vehicle of claim 1, said inflation suppression portion is reinforced by two-sheet overlapped cloth-made reinforcing materials, and said two-sheet cloth-made reinforcing materials are attached to said curtain airbag such that respective fiber directions of the two-sheet cloth-made reinforcing materials attached cross each other.

19. A passenger protection device of vehicle, comprising:
a curtain airbag stored behind a pillar trim and a top ceiling such that the curtain airbag in a stored state extends in a vehicle longitudinal direction, being isolated from an inside of a vehicle compartment; and
a guide portion provided at an upper portion of the pillar trim so as to guide the curtain airbag toward the vehicle compartment during the curtain airbag is inflated,
wherein said curtain airbag includes an upper gas-flow passage at a position which corresponds to an upper portion of the curtain airbag in an inflated state, the upper gas-flow passage being configured to extend in the vehicle longitudinal direction, crossing said guide portion, and connect to a gas inlet portion in which inflating gas flows from an inflator,
said curtain airbag includes an inflation suppression portion at a position which overlaps with said guide portion when viewed from the inside of the vehicle compartment, the inflation suppression portion being configured to suppress inflation of part of the curtain airbag where the inflation suppression portion is provided,
said inflation suppression portion is arranged at a front portion of said upper gas-flow passage, and said curtain airbag comprises a cell which is formed at a position located in front of said inflation suppression portion, the cell being configured such that an upper-side portion thereof is closed and the inflating gas flows in from a lower-side portion thereof when the curtain airbag is inflated,
said curtain airbag comprises an inflation portion which is positioned located below said inflation suppression portion and extends vertically along the pillar trim when the curtain airbag is inflated, the inflation portion being configured such that the inflating gas flows in from a lower-side portion thereof,
an inner bag is provided at said gas inlet portion of the curtain airbag, said inner bag branches at a position located above said inflation suppression portion into two or more branch flow passages which connect to gas-flow passages, and each of said branch flow passages extend downward to a position which overlaps with the inflation suppression portion,
respective openings of said branch flow passages which open at said upper gas-flow passage are positioned at areas which are located outside said pillar trim in the vehicle longitudinal direction,
said curtain airbag includes a vertical gas-flow passage which extends in a vertical direction along the pillar trim at a position located in front of said inflation suppression portion, and one of said branch flow passages is provided to extend to said vertical gas-flow passage extending in the vertical direction along the pillar trim.

20. The passenger protection device of the vehicle of claim 19, said inflation suppression portion is reinforced by two-sheet overlapped cloth-made reinforcing materials, and said two-sheet cloth-made reinforcing materials are attached to said curtain airbag such that respective fiber directions of the two-sheet cloth-made reinforcing materials attached cross each other.

* * * * *